US012320368B2

(12) United States Patent
Lowman et al.

(10) Patent No.: US 12,320,368 B2
(45) Date of Patent: Jun. 3, 2025

(54) RIDE CONTROL FOR WORK MACHINES

(71) Applicant: Danfoss A/S, Nordborg (DK)

(72) Inventors: Roger D. Lowman, Simpsonville, SC (US); Chad Anthony Larish, Rochester, MN (US); Stephen Smith, Nordborg (DK); Sam Newbauer, St. Paul, MN (US)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/040,113

(22) PCT Filed: Jul. 26, 2021

(86) PCT No.: PCT/EP2021/025285
§ 371 (c)(1),
(2) Date: Jan. 31, 2023

(87) PCT Pub. No.: WO2022/022857
PCT Pub. Date: Feb. 3, 2022

(65) Prior Publication Data

US 2023/0279877 A1 Sep. 7, 2023

Related U.S. Application Data

(60) Provisional application No. 63/059,670, filed on Jul. 31, 2020.

(51) Int. Cl.
*F15B 1/04* (2006.01)
*B66F 9/22* (2006.01)
(Continued)

(52) U.S. Cl.
CPC .................. *F15B 1/04* (2013.01); *B66F 9/22* (2013.01); *E02F 9/2207* (2013.01);
(Continued)

(58) Field of Classification Search
CPC ......... E02F 9/2271; E02F 9/2207; B66F 9/22; F15B 1/04
See application file for complete search history.

(56) References Cited

U.S. PATENT DOCUMENTS

| | | | |
|---|---|---|---|
| 8,387,378 | B2 | 3/2013 | Thomas |
| 10,337,532 | B2 | 7/2019 | Ma et al. |
| 2013/0227937 | A1 | 9/2013 | Dobchuk |

FOREIGN PATENT DOCUMENTS

| | | |
|---|---|---|
| DE | 10107139 | 9/2002 |
| DE | 102008064136 | 7/2010 |

(Continued)

OTHER PUBLICATIONS

Brain et al., "How Caterpillar Backhoe Loaders Work," HowStuffWorks, Inc., Copyright 1998-2010, obtained from https://science.howstuffworks.com/transport/engines-equipment/backhoe-loader6.

(Continued)

*Primary Examiner* — Kenneth Bomberg
*Assistant Examiner* — Daniel S Collins
(74) *Attorney, Agent, or Firm* — Merchant & Gould P.C.

(57) ABSTRACT

A hydraulic system can include a hydraulic actuator including a piston rod slidably disposed within a housing having a base-side port and a rod-side port, a hydraulic pump, a hydraulic reservoir, an accumulator, a first control valve operable to selectively control flow from the pump to the base-side port and from the base-side port to the reservoir, a second control valve operable to selectively control flow from the pump to the rod-side port and from the rod-side port to the reservoir, a third control valve operable to selectively allow flow between the base-side port and the accumulator, and a controller for operating the hydraulic system and including a ride control mode in which damping
(Continued)

is provided to the hydraulic actuator by operation of the first, second, and third control valves.

23 Claims, 17 Drawing Sheets

(51) Int. Cl.

| | |
|---|---|
| ***E02F 9/22*** | (2006.01) |
| ***F15B 1/26*** | (2006.01) |
| ***F15B 11/08*** | (2006.01) |
| ***F15B 13/02*** | (2006.01) |
| ***F15B 13/04*** | (2006.01) |

(52) U.S. Cl.
CPC ............ *E02F 9/2217* (2013.01); *E02F 9/226* (2013.01); *E02F 9/2267* (2013.01); *E02F 9/2271* (2013.01); *E02F 9/2285* (2013.01); *F15B 1/26* (2013.01); *F15B 11/08* (2013.01); *F15B 13/024* (2013.01); *F15B 13/0401* (2013.01); *E02F 9/2296* (2013.01)

(56) References Cited

FOREIGN PATENT DOCUMENTS

| | | |
|---|---|---|
| DE | 102008064139 | 7/2010 |
| DE | 102009047035 | 6/2011 |
| JP | 2004301215 | 10/2004 |
| WO | 2009067052 A1 | 5/2009 |

OTHER PUBLICATIONS

Heney, "The gravity of precise boom control," JLG Industries, Inc., Sep. 21, 2017.
HydraForce, Inc., "Electro Hydraulic Control Solutions for Wheel Loaders," Copyright 2016.
International Search Report and Written Opinion received for PCT Application No. PCT/EP2022/025026 on Jun. 2, 2022, 16 pgs.
International Search Report and Written Opinion received for PCT Application No. PCT/EP2021/025286 on Nov. 24, 2021, 14 pgs.
International Search Report and Written Opinion received for PCT Application No. PCT/EP2022/025024 on May 11, 2022, 14 pgs.
International Search Report and Written Opinion received for PCT Application No. PCT/EP2021/025285 on Feb. 9, 2022, 16 pgs.

RIDE CONTROL FOR WORK MACHINES

CROSS-REFERENCE TO RELATED APPLICATION(S)

This application is a National Stage Application of PCT/EP2021/025285, filed 26 Jul. 2021, which claims benefit of U.S. Patent Application Ser. No. 63/059,670, filed on Jul. 31, 2020, the disclosure of which is incorporated herein by reference in its entirety. To the extent appropriate, a claim of priority is made to each of the above disclosed applications.

BACKGROUND

Work machines, such as fork lifts, wheel loaders, track loaders, excavators, backhoes, bull dozers, fire trucks and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. The hydraulic system typically includes a number of work sections for operating actuators via control valve assemblies. Many work machines are provided without independent suspension systems. Accordingly, when work machines are carrying a load via the work implement while moving in a forward or reverse direction, significant oscillations of the work machine induced by bouncing of the load can occur. Without compensating for this circumstance, an operator generally must reduce the speed of the work machine in order to maintain acceptable control of the work machine. Ride control systems for such work machines are known in which the hydraulic fluid of the hydraulic system is used to dampen the oscillations. Frequently, such systems require the addition of numerous control components, such as control valves. While these systems are beneficial in increasing performance, they introduce additional cost and complexity. Improvements are desired.

SUMMARY

A hydraulic system can include a hydraulic actuator including a first port and a second port, a hydraulic pump, a hydraulic reservoir, an accumulator, a first control valve operable to selectively control flow from the pump to the first port and from the first port to the reservoir, a second control valve operable to selectively control flow from the pump to the second port and from the second port to the reservoir, a third control valve operable to selectively allow flow between the first port and the accumulator, and a controller for operating the hydraulic system and including a ride control mode in which damping is provided to the hydraulic actuator by operation of the first, second, and third control valves. In some examples, the hydraulic actuator is a linear type actuator having a piston rod slidably disposed within a housing and wherein the first port is a base-side port and the second port is a rod-side port.

A hydraulic system can include a hydraulic actuator including a piston rod slidably disposed within a housing having a base-side port and a rod-side port, a hydraulic pump, a hydraulic reservoir, an accumulator, a first control valve operable to selectively control flow from the pump to the base-side port and from the base-side port to the reservoir, a second control valve operable to selectively control flow from the pump to the rod-side port and from the rod-side port to the reservoir, a third control valve operable to selectively allow flow between the base-side port and the accumulator, and a controller for operating the hydraulic system and including a ride control mode in which damping is provided to the hydraulic actuator by operation of the first, second, and third control valves.

In some examples, the ride control mode includes a passive bounce-down dampening control in which: the first control valve is operated to isolate the base-side port from both the pump and the reservoir, the second control valve is operated to place the rod-side port in fluid communication with the reservoir, and the third control valve is operated to place the accumulator in fluid communication with the base-side port.

In some examples, the system further includes a pressure sensor in fluid communication with the rod-side port, wherein the ride control mode includes an active bounce-up dampening control in which: the first control valve is operated to isolate the base-side port from both the pump and the reservoir, the second control valve is operated to place the rod-side port in fluid communication with the reservoir and modulated to meet a meter-out pressure set point value at the pressure sensor, and the third control valve is operated to place the accumulator in fluid communication with the base-side port.

In some examples, the third control valve is a two-position solenoid valve.

In some examples, the system further includes a first pressure sensor in fluid communication with the base-side port, wherein the ride control mode includes an active bounce-down dampening control in which: the first control valve is operated to isolate the base-side port from both the pump and the reservoir, the second control valve is operated to place the rod-side port in fluid communication with the reservoir, and the third control valve is operated to place the accumulator in fluid communication with the base-side port and modulated to meet a pressure set point value at the first pressure sensor.

In some examples, the system further includes a second pressure sensor in fluid communication with the rod-side port, wherein the ride control mode includes an active bounce-up dampening control wherein: the first control valve is operated to isolate the base-side port from both the pump and the reservoir, the second control valve is operated to place the rod-side port in fluid communication with the reservoir and modulated to meet a meter-out pressure set point value at the second pressure sensor, and the third control valve is operated to place the accumulator in fluid communication with the base-side port and modulated to meet a pressure set point value at the first pressure sensor.

In some examples, the system further includes a fourth control valve disposed between the base-side port and the first control valve, wherein the fourth control valve is operable between open and closed positions, and is placed in the closed position when the ride control mode is active.

In some examples, the system further includes a relief valve in fluid communication with the base-side port and the first control valve, wherein the first control valve has a neutral position including an orifice placing the reservoir in fluid communication with the base-side port via an orifice within the first control valve, wherein, when the ride control mode is active, the first control valve is in the neutral position such that when hydraulic fluid flows through the relief valve, the hydraulic fluid flows through the orifice to the reservoir.

In some examples, the system further includes a relief valve piloted by fluid from the rod-side port.

In some examples, the hydraulic actuator is a linear hydraulic actuator.

In some examples, the first and second control valves are disposed in a common valve assembly.

In some examples, the first, second, and third control valves are disposed in a common valve assembly.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
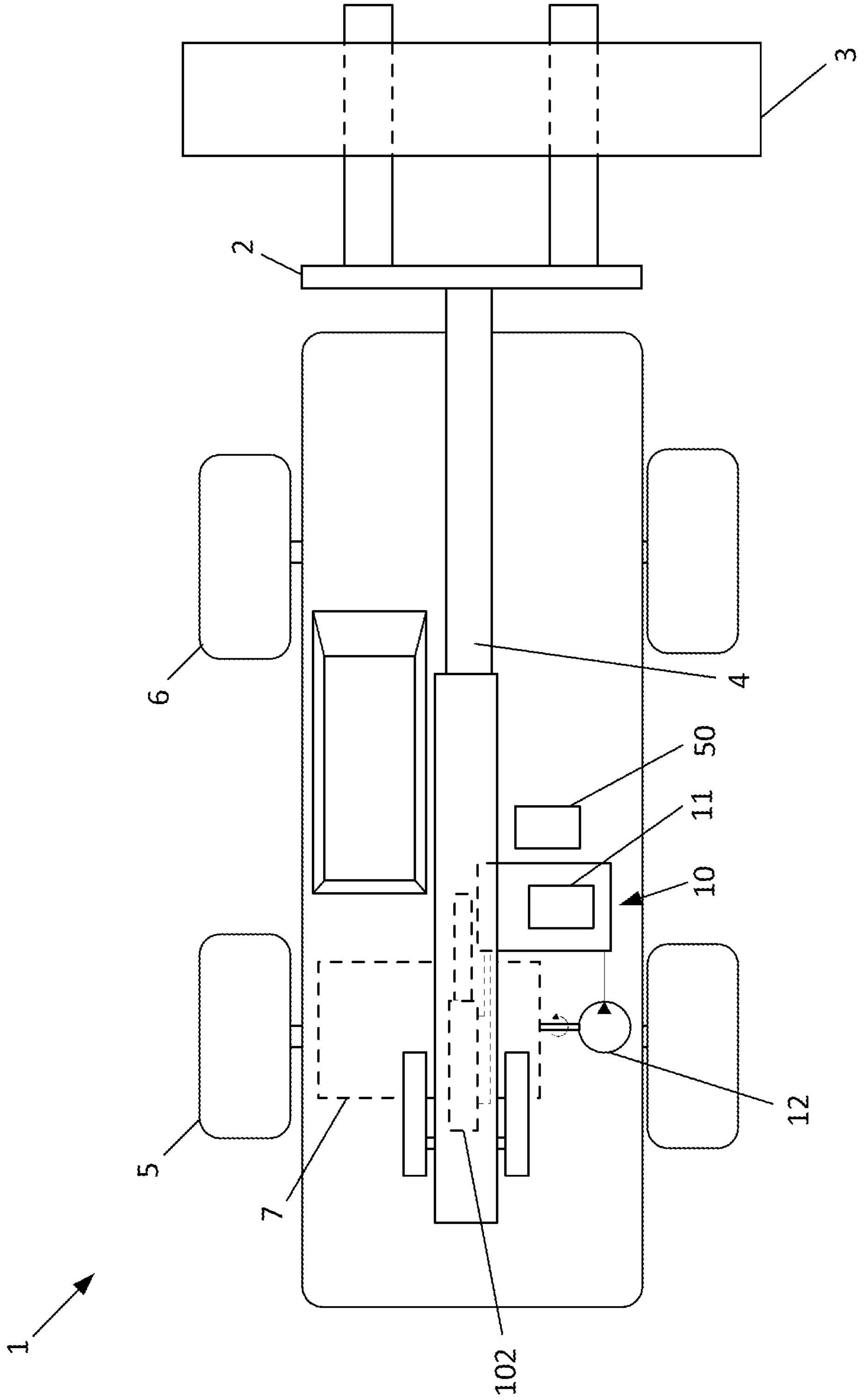
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Description

Figure 2:
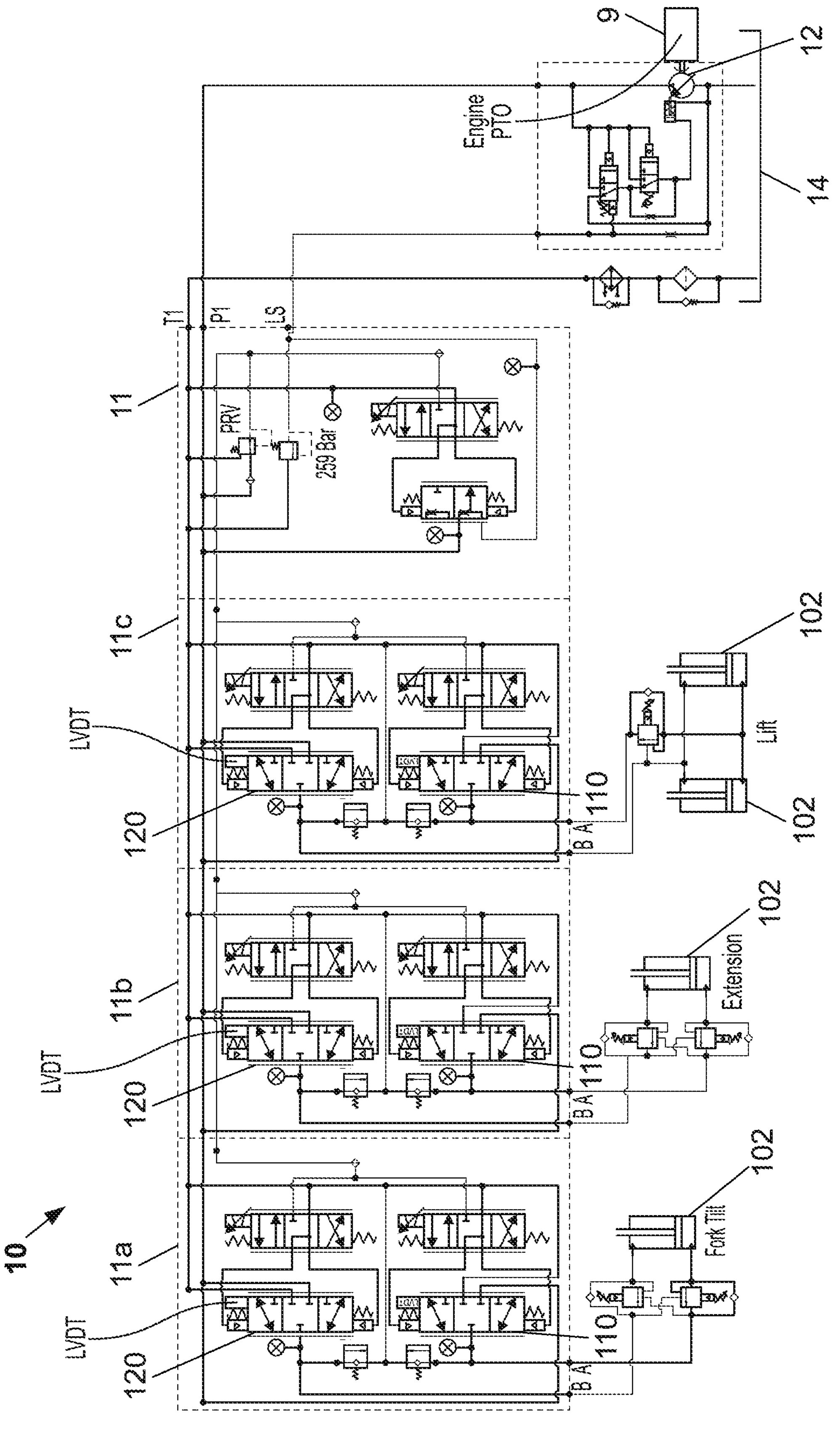
FIG. 2 is a schematic view of a hydraulic system including work circuits suitable for use in the work machine shown in FIG. 1.

As depicted at FIGS. 1 and 2, a work machine 1 and hydraulic system 10 are shown. The work machine 1 may be any type of work machine, for example a telehandler, fork lift, wheel loader, track loader, excavator, backhoe, bull dozer, or fire truck. As depicted, work machine 1 includes a work attachment 2 for performing a variety of lifting tasks associated with a load 3. In one embodiment, the work machine 1 is a telehandler having a telescoping boom 4 that supports the work attachment 2. In one embodiment, the work attachment 2 includes a pair of forks. However, one skilled in the art will appreciate that the work attachment may be any hydraulically powered work implement.

Work machine 1 is also shown as including at least one drive wheel 5 and at least one steer wheel 6. In certain embodiments, one or more drive wheels 5 may be combined with one or more steer wheels 6. The drive wheels 5 are powered by an engine 7. Engine 7 is also configured to power a hydraulic system 10 including various work circuits 11. As illustrated at FIG. 2, example work circuits 11 are a tilt work circuit 11*a*, an extension work circuit 11*b*, and a lift work circuit 11*c*. The work circuits 11 can be powered by a hydraulic pump 12 and placed in fluid communication with a common reservoir 14. In some examples, the work machine 1 includes hydraulic actuators and valves for effectuating steering and propulsion, stabilizing, and for lifting, extending, tilting, and sideways motions of the work attachment 2. In one embodiment, the pump 12 is powered indirectly by the engine 7. In one embodiment, the pump 12 is mechanically coupled to the engine 7, such as by an output shaft or a power take-off 9. In operation, the work circuit 11 actuates the work attachment 2 by operation of the pump 12 in cooperation with a number of hydraulic actuators 102 and control valves 110, 120. As shown, the pump 12 is a variable displacement axial pump provided with a conventional load-sense control arrangement to control the displacement of the pump 12 such that an appropriate flow can be delivered to the work circuits 11. In one aspect, the load-sense arrangement can include a load-sense spool, a maximum pressure cut-off spool, and an actuator for adjusting a swash plate angle of the pump 12. Although three work circuits are shown, additional work circuits can be provided in the hydraulic system without departing from the concepts presented herein. Although an example work machine 1 is shown and described, the disclosure is not limited to any particular work machine and is broadly applicable to any hydraulic system including actuators operated via control valves and a pump. In the example shown, the actuator 102 is associated with a lift function of a boom and is configured as a linear actuator. Other types of actuators may be used in various applications. For example, a rotary type hydraulic actuator may be used in a winch application.

Hydraulic System—FIGS. 3 to 7

Figure 3:
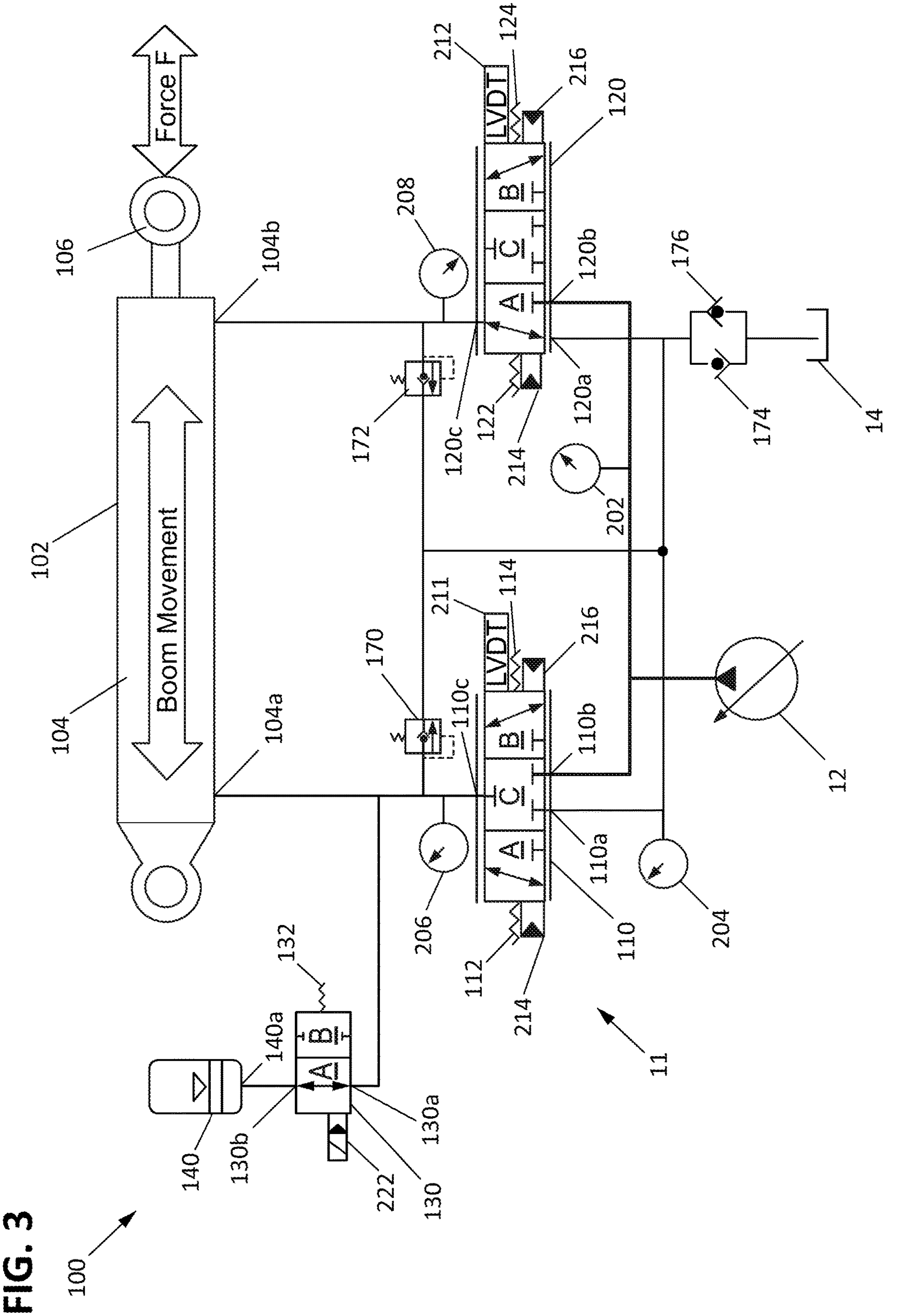
FIG. 3 is a schematic of a portion of the hydraulic system shown in FIG. 2 including a first example of a lift cylinder work section operable in a ride control mode.

Referring to FIG. 3, an example work circuit 11 for operating an actuator 102 is presented for use in a hydraulic system 100 which may in turn form part of hydraulic system 10. In the example shown, the actuator 102 is associated with a lift function of a boom. Although a single actuator 102 is shown, it should be understood that the depicted work circuit could include multiple actuators 102 operated by the same control valves 110, 120 as is shown, for example, at FIG. 2.

In one aspect, the actuator 102 has a housing 104 with a base-side port 104*a* and a rod-side port 104*b* and piston rod 106 slidably disposed within the housing 104. As fluid enters the base-side port 104*a* and exits the rod-side port 104*b*, the piston rod 106 extends. Likewise, as fluid enters the rod-side port 104*b* and exits the base-side port 104*a*, the piston rod 106 contracts.

As shown, the work circuit 11 includes a first control valve 110 and a second control valve 120 for controlling the position and function of the actuator(s) 102. Each of the control valves 110, 120 is configured as a three-position, three-way valve with ports 110*a*, 110*b*, 110*c* and 120*a*, 120*b*, 120*c*, respectively. The control valves 110, 120 are also operable between positions A, B, and C. Each control valve 110, 120 is also shown as being provided with oppositely acting centering springs 112, 114 and 122, 124 for biasing the control valves 110, 120 into the position C. Oppositely acting actuators 214, 216 are provided for moving the control valve into either position B or C via a control system 50. The actuators 214, 216 can be any type of actuators for selectively controlling the position of the control valves 110, 120, for example, the actuators 214, 216 can be electric, hydraulic, electro-hydraulic, mechanical, and/or any other type of actuator capable of performing the operations described herein. Position sensors 211, 212, which may be configured as LVDT (Linear Variable Differential Transformer) sensors, are also shown as being provided with each control valve 110, 120. The work circuit 11 is also shown as being provided with pressure sensors 202, 204, 206, and 208, with counterbalance valves 170, 172, and oppositely acting check valves 174, 176. The check valves 174 and/or 176 may be utilized where the reservoir is pressurized to avoid cavitation, for example during a load bounce-down, depending on the system.

As configured, the first control valve 110 is in fluid communication with the base-side port 104*a* via port 110*c* while the second control valve 120 is in fluid communication with the rod-side port 104*b* via port 120*c*. When the first control valve 110 is in the first position A and the second control valve 120 is in the second position B, the port 104*a* is placed in fluid communication with the reservoir 14 via ports 110*a*, 110*c* and the port 104*b* is placed in fluid communication with the pump 12 via ports 120*b*, 120*c* such that the piston rod 106 contracts. When the first control valve 110 is in the second position B and the second control valve 120 is in the first position A, the port 104*a* is placed in fluid communication with the pump 12 via ports 110*b*, 110*c* and the port 104*b* is placed in fluid communication with the reservoir 14 via ports 120*a*, 120*c* such that the piston rod 106 extends. Generally, when either or both of the control valves 110, 120 are in the third position C, at least one of the ports 104*a*, 104*b* is blocked such that fluid flow via the pump 12 and/or reservoir 14 is blocked through the actuator 102.

The work circuit 11 is also shown as including an accumulator arrangement including an accumulator 140 and a control valve 130. In one aspect, the accumulator 140 has a port 140*a* while a control valve 130 has ports 130*a*, 130*b*, wherein the ports 140*a*, 130*a* are in fluid communication with each other and the port 130*b* is in fluid communication with the base-side port 104*a*. As configured, the control valve 130 is a two-position, two-port control valve movable between first and second positions A, B. The control valve 130 is provided with a biasing spring 132 that biases the control valve 130 towards the position B and an actuator 222 for actuating the control valve 130 towards the position A. The actuator 222 can be any type of actuator for selectively controlling the position of the control valve 130, for example, the actuator 222 can be electric, hydraulic, electro-hydraulic, mechanical, and/or any other type of actuator capable of performing the operations described herein. In the position A, the ports 130*a* and 130*b* are placed in fluid communication such that the accumulator port 140*b* is placed in fluid communication with the actuator base-side port 104*a*. In the position B, the ports 130*a* and 130*b* are isolated from each other such that fluid flow into or out of the accumulator 140 is blocked.

Figure 4:
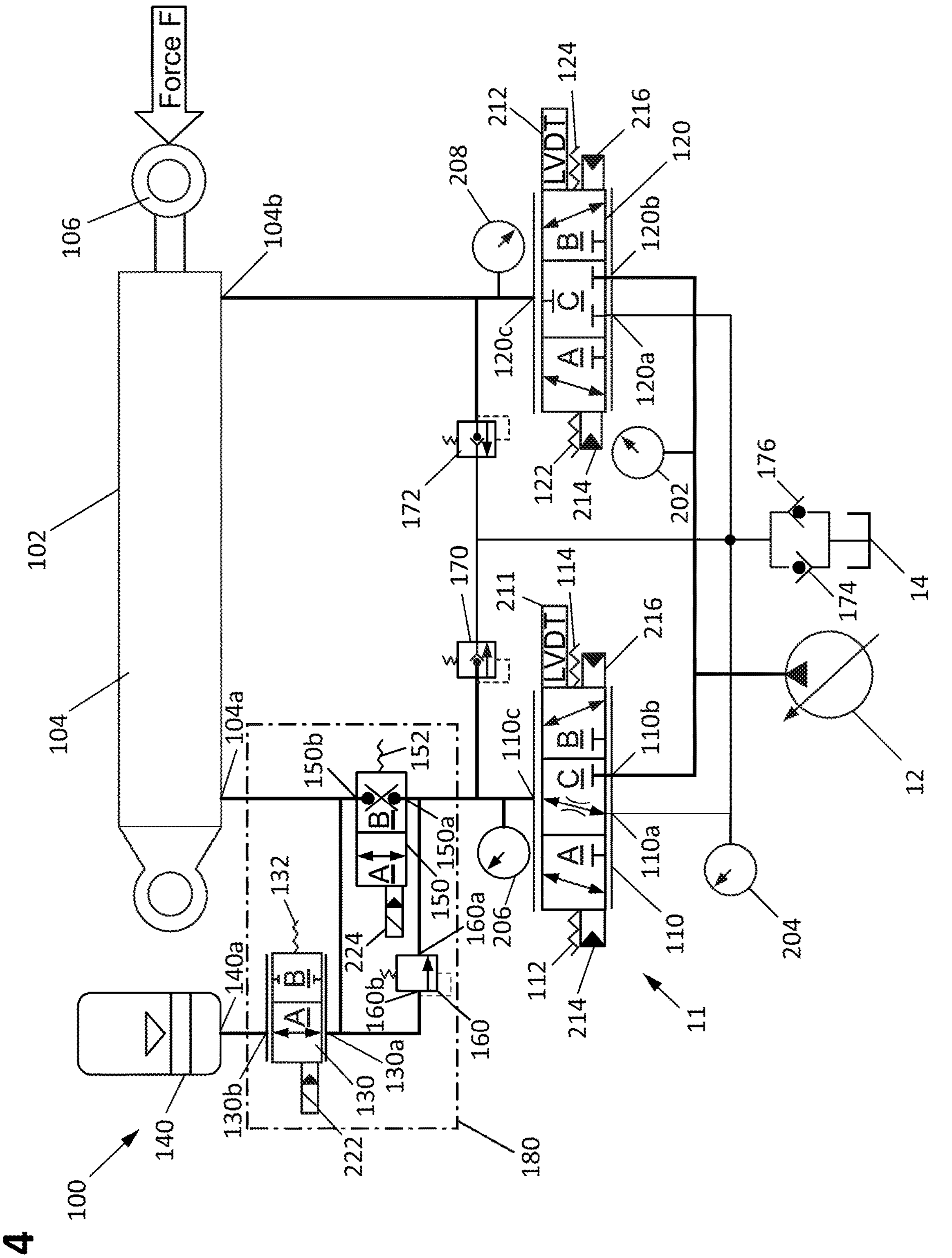
FIG. 4 is a schematic of a portion of the hydraulic system shown in FIG. 2 including a second example of a lift cylinder work section operable in a ride control mode.

With reference to FIG. 4, the work circuit 11 is shown as further including an arrangement 180 having a load-holding valve 150, shown herein as a poppet valve. As configured, the load-holding valve 150 is a two-position, two-port control valve with ports 150*a*, 150*b* and is movable between first and second positions A, B. As shown, the port 150*a* is in fluid communication with the base-side port 104*a* and with the port 130*a* of the valve 130. The port 150*b* is in fluid communication with the port 110*c* of the valve 110. The control valve 150 is provided with a biasing spring 152 that biases the control valve 150 towards the position B and with an actuator 224 for actuating the control valve 150 towards the position A. The actuator 224 can be any type of actuator for selectively controlling the position of the control valve 150. For example, the actuator 224 can be electric, hydraulic, electro-hydraulic, mechanical, and/or any other type of actuator capable of performing the operations described herein. In the position A, the ports 150*a* and 110*b* are placed in fluid communication such that fluid can flow between the valve 110 and the base-side port 104*a*. In the position B, the ports 150*a* and 150*b* are isolated from each other such that fluid flow between the valve 110 and the base-side port 104*a* is blocked. Accordingly, the valve 150 can act as a load-holding valve to prevent retraction of the actuator 102 when the valve 150 is in the second position B. With such a configuration, the control valve 110 can be provided with a spring offset or software control to functionally form an orifice to allow fluid flow to achieve equilibrium with the reservoir 14. Accordingly, when a ride control mode is active and the control valve is in the position C and hydraulic fluid is flowing through the below-described relief valve 160, the hydraulic fluid can flow through the control valve 110 to the reservoir 14.

Figure 5:
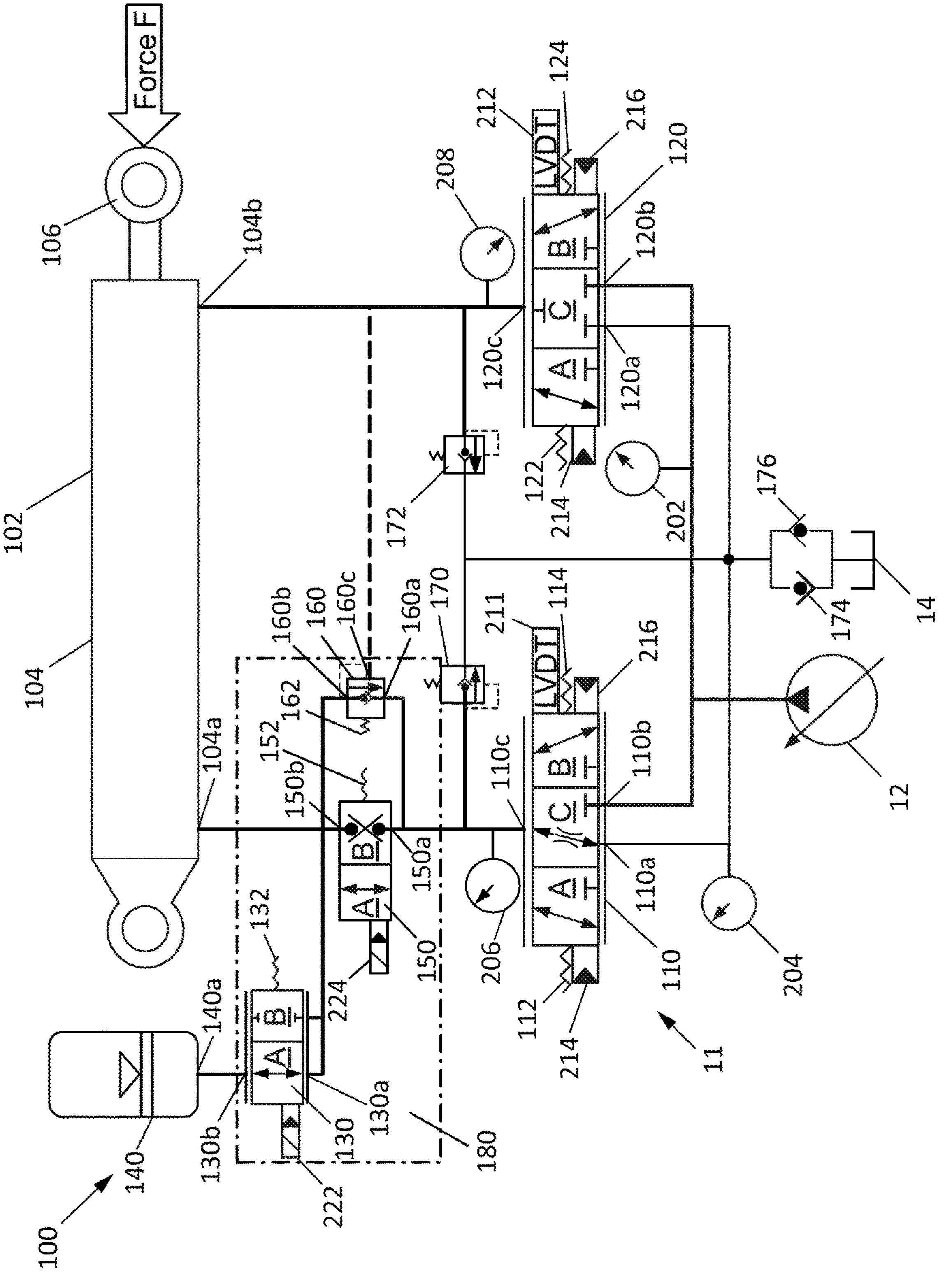
FIG. 5 is a schematic of a portion of the of the hydraulic system shown in FIG. 2 including a third example of a lift cylinder work section operable in a ride control mode, with the work section in a neutral control phase.
Figure 6:
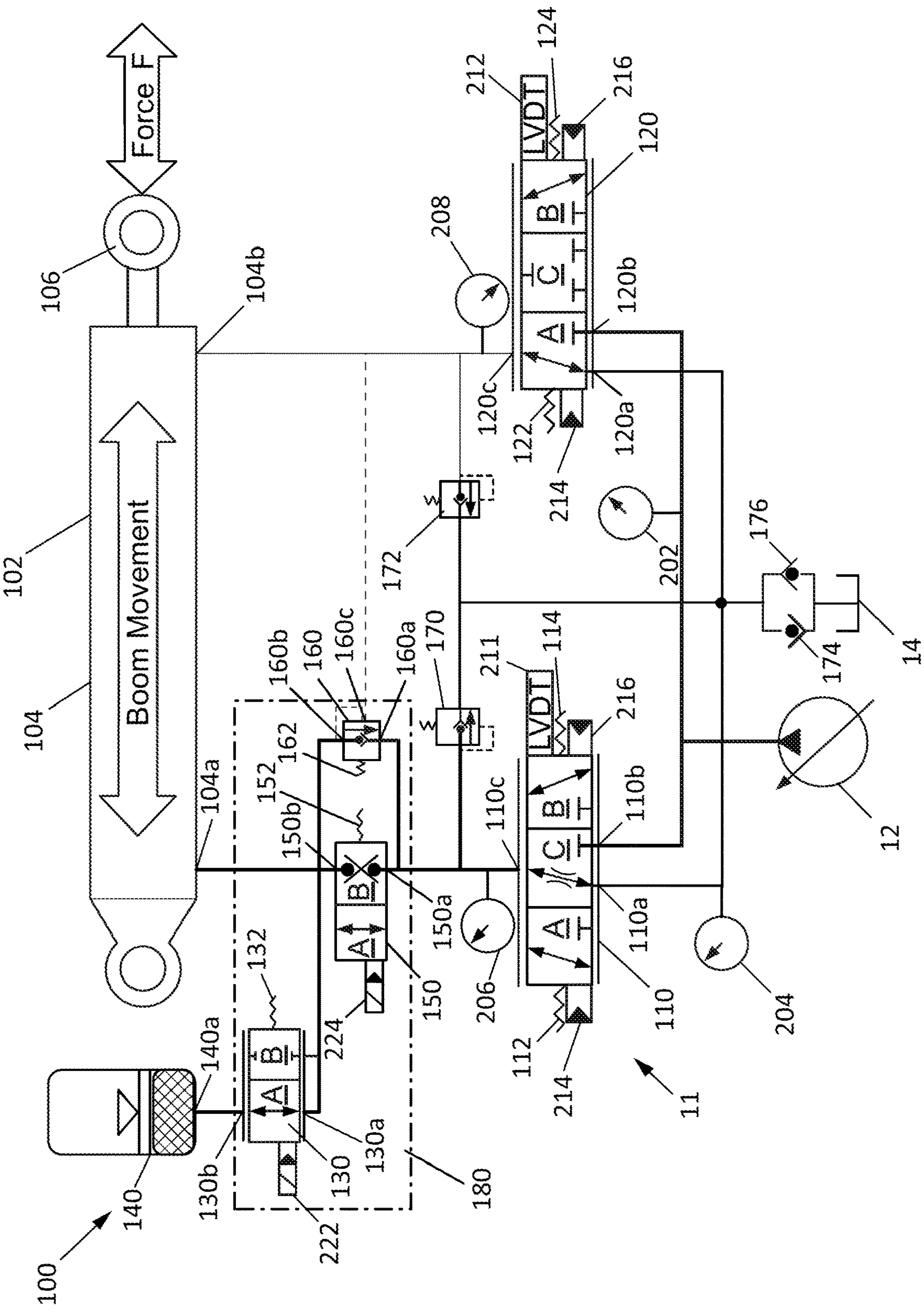
FIG. 6 is a schematic of the lift cylinder work section shown in FIG. 5, with the work section operated in either a bounce up or bounce down control phase.
Figure 7:
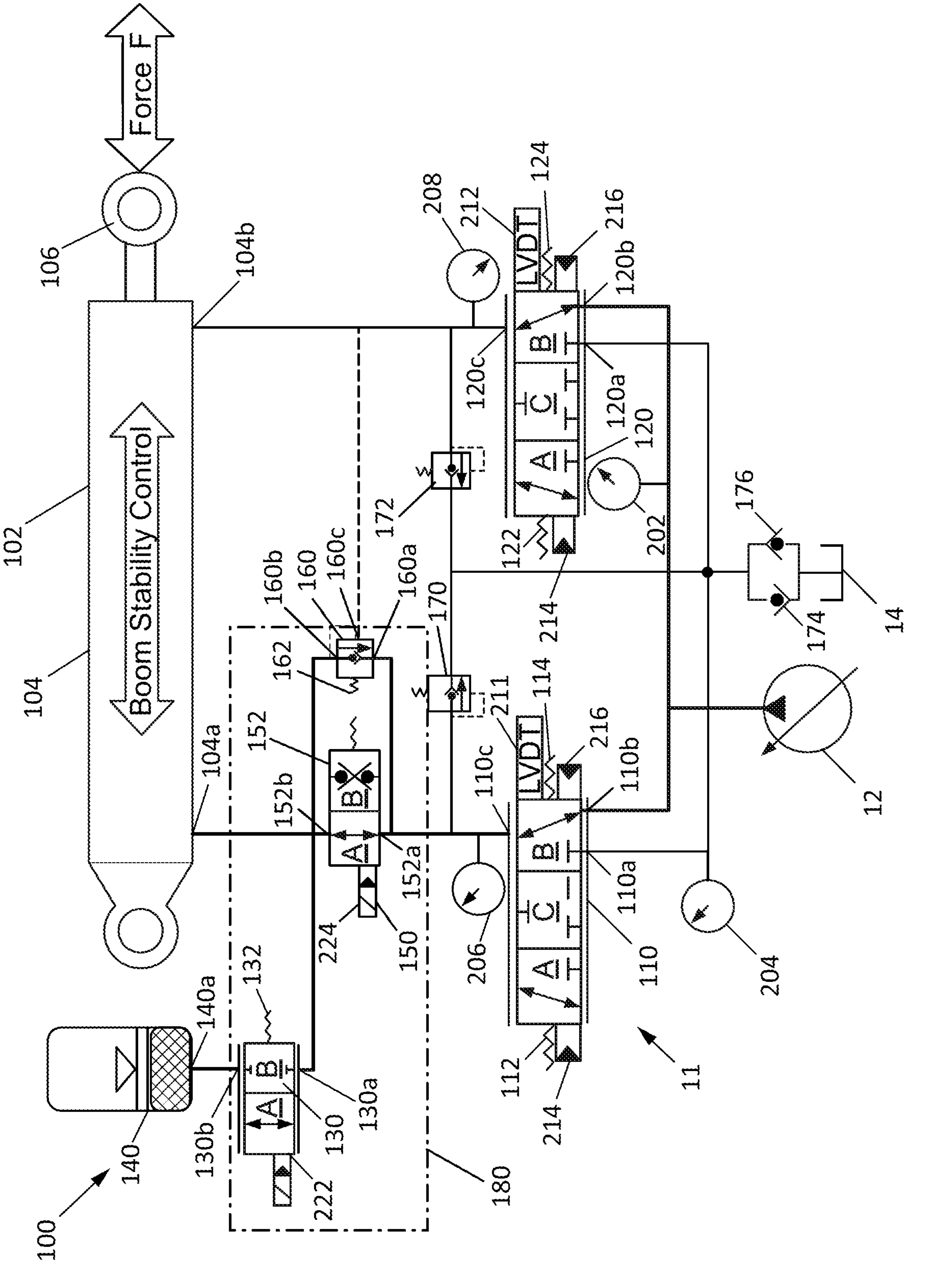
FIG. 7 is a schematic of the lift cylinder work section shown in FIG. 5, with the work section operated in a boom stability control mode.

With reference to FIGS. 5 to 7, the work circuit 11 and arrangement 180 are further shown as including a counter-balance/relief valve 160 with ports 160*a*, 160*b* that provides a flow path around the load-holding valve 150 and is piloted by fluid from the rod-side port 104*b* and/or the control valve 120. The counterbalance valve is biased in a closed position by a spring 162 such that the ports 160*a*, 160*b* are normally isolated from each other. The valve 160 can also be provided with a port 160*c* for receiving a pilot fluid. When sufficient pressure exists, for example when thermal relief is required, fluid flow is allowed to pass through ports 160*a*, 160*b* and around valve 150. It is noted that the any of the actuators associated with operating the control valves of the present disclosure may be configured as proportional actuators.

Ride Control Mode for Configurations of FIGS. 3 to 7

In general, the configurations shown at FIGS. 3 to 7 may be referred to as cylinder-side ride-control configurations as the accumulator 140 is in fluid communication with at least one of the actuator ports 104*a*, 104*b*. Through the use of the control system 50, described in more detail below, the above-described control valves and sensors can be used in conjunction to effectuate a ride-control mode in bounce-up and bounce-down control phases. By use of the term ride-control mode, it is meant to include a control mode or configuration effectuated by the control valves that minimizes the bouncing of a load supported by the work attachment when the associated vehicle or work machine is moving in a direction, for example a forward direction via drive wheels 5. By use of the term bounce-up control, it is meant to include a ride control mode phase that minimizes the bouncing of the load in an upward direction against gravity. By use of the term bounce-down control, it is meant to include a ride control mode phase that minimizes the bouncing of the load in a downward direction with gravity. In general terms, the ride control mode of the configurations shown in FIGS. 3 to 7 can be effectuated through the operation of the control valves 110, 120, and 130. As the valves 110, 120 are already present in the system for control of the actuator 102, the disclosed ride control modes can be accomplished with a minimum of additional components, as compared to prior art approaches.

In one example, the ride control mode can include a passive bounce-down dampening control phase in which the control valve 110 is operated to the position C to isolate the base-side port 104*a* from both the pump 12 and the reservoir 14, the control valve 120 is operated to the position A to place the rod-side port 104*b* in fluid communication with the reservoir 14, and the control valve 130 is operated to the position A to place the accumulator in fluid communication with the base-side port 104*a*. With such a configuration, the accumulator can absorb the fluid pushed out of the base-side port 104*a* due to a bounce-down condition in which a load is causing the actuator 102 to retract, thereby dampening the bouncing of the load.

In one example, the ride control mode can include an active bounce-up dampening control phase in which the control valve 110 is operated to the position C to isolate the base-side port 104*a* from both the pump 12 and the reservoir 14, the control valve 120 is operated between positions A and C in a metering or modulating state to place the rod-side port 104*b* in fluid communication with the reservoir 14 and to meet a meter-out pressure set point value at the pressure sensor 208, and the control valve 130 is operated to the position A place the accumulator 140 in fluid communication with the base-side port 104*a*. With such a configuration, the control valve 120 can act as a dampening orifice and the reservoir can absorb the fluid pushed out of the rod-side port 104*b* due to a bounce-up condition in which a load is causing the actuator 102 to extend, thereby dampening the bouncing of the load. In some examples, the control valve 130 is actively modulated with reference to the pressure sensor 206 to control flow out of the accumulator and into the base-side port 104*a* during the bounce-up control phase.

In one example, the ride control mode can include an active bounce-down dampening control phase in which the control valve 110 is operated to the position C to isolate the base-side port 104*a* from both the pump 12 and the reservoir 14, the control valve 120 is operated between positions A and C in a metering or modulating state to place the rod-side port 104*b* in fluid communication with the reservoir 14 and to meet a meter-out pressure set point value at the pressure sensor 208, and the control valve 130 is operated to the position A place the accumulator 140 in fluid communication with the base-side port 104*b*. In some examples, the control valve control valve 130 is actively modulated with reference to the pressure sensor 206 to control flow into the accumulator and out of the base-side port 104*a* during the bounce-down control phase.

Where a load-holding valve 150 is provided, the load-holding valve can be placed in the closed position B when the ride control mode is active.

Hydraulic System—FIGS. 8 to 17

The hydraulic system configurations shown at FIGS. 8 to 17 are generally similar to those shown at FIGS. 3 to 7 with respect to the configurations of the pump 12, reservoir 14, and the valves 110, 120, 150, 160, 170 to 176. Accordingly, the descriptions for these components need not be repeated here. Rather the differences between the systems will be discussed. The primary difference between the systems is that the accumulator 140 in the configurations shown at FIGS. 8 to 17 is placed in fluid communication with the pump 12 and reservoir 14 via valves 130 and 135. As configured, the valve 130 controls fluid flow between the accumulator 140 and the reservoir-side components (e.g. the reservoir 14, port 110*a* of valve 110, and port 120*a* of valve 120) and the valve 135 controls fluid between the accumulator 140 and the pump-side components (e.g. the pump 12, port 110*b* of valve 110, and port 120*b* of valve 120). A check valve 178 is also shown such that fluid flow can occur between the ports 110*b*, 120*b* and the accumulator 140 via valve 130 without requiring involvement of the pump 12 or causing fluid to flow in a reverse direction through the pump 12. Also, as the accumulator 140 is no longer in direct fluid communication with the actuator port 104*a*, a pressure sensor 210 can be provided to provide an input for the accumulator pressure. Also, as illustrated at FIGS. 10 to 17, valves 150 and 160 can also be provided in the system, as is described previously for the systems shown at FIGS. 5-7. It is noted that the any of the actuators associated with operating the control valves of the present disclosure may be configured as proportional actuators.

Ride Control Modes for Configurations of FIGS. 8-17

In general, the configurations shown at FIGS. 8 to 17 may be referred to as pump-side ride-control configurations as the accumulator 140 is in fluid communication with the pump 12 via valve 135 rather than being directly connected to at least one of the actuator ports 104*a*, 104*b*. Through the use of the control system 50, described in more detail below, the above-described control valves and sensors can be used in conjunction to effectuate a ride-control mode in bounce-up and bounce-down control phases. In general terms, the ride control mode of the configurations shown in FIGS. 8 to 17 can be effectuated through the operation of the control valves 110, 120, 130, and 135. As the valves 110, 120 are already present in the system for control of the actuator 102, the disclosed ride control modes can be accomplished with a minimum of additional components, as compared to prior art approaches.

Figure 8:
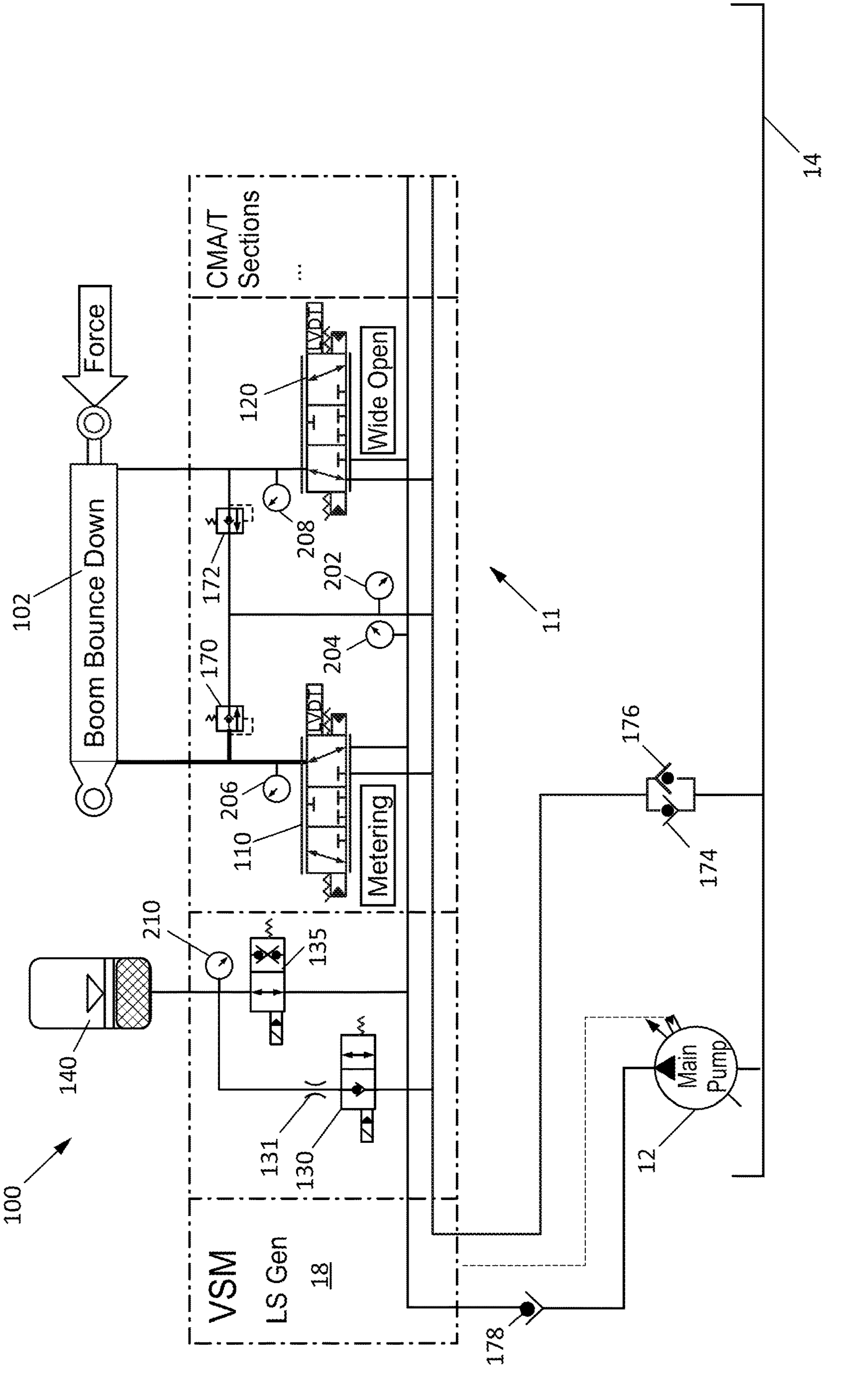
FIG. 8 is a schematic of a portion of the of the hydraulic system shown in FIG. 2 including a fourth example of a lift cylinder work section operable in a ride control mode, with the work section being in a bounce down control phase.
Figure 15:
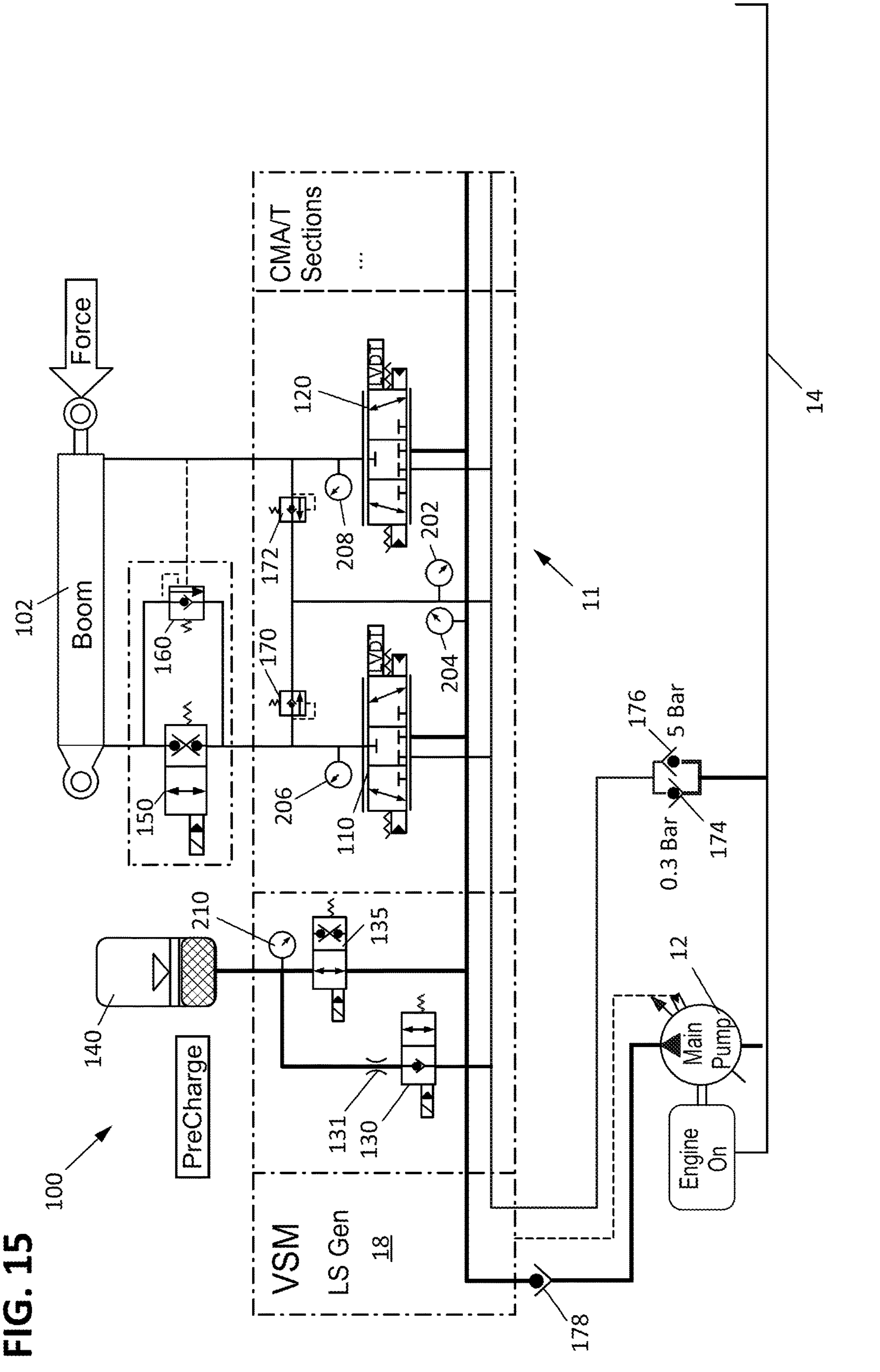
FIG. 15 is a schematic of the lift cylinder work section shown in FIG. 10, with the work section operated in a pre-charge control mode.

With reference to FIGS. 8 and 15, the hydraulic system 100 can be placed in a charge or pre-charge mode in which the accumulator 140 pressure is charged with fluidized pressure from the pump 12. In one aspect, boom pressure is read by the control system at pressure sensor 206 and the accumulator 140 is charged by sending load-sense pressure from a load-sense arrangement 18 to the pump 12 until the pressure sensor 210 indicates the accumulator 140 is at the desired pressure. Any overshoot may be drained using orifice 131 and control valve 130. Similarly, the accumulator 140 can be drained by de-energizing the control valve 130 such that fluid can flow from the accumulator 140 to the reservoir 14. The check valve 178 may be included to ensure the pump 12 does not go over center from accumulator or load induced pressure.

Figure 12:
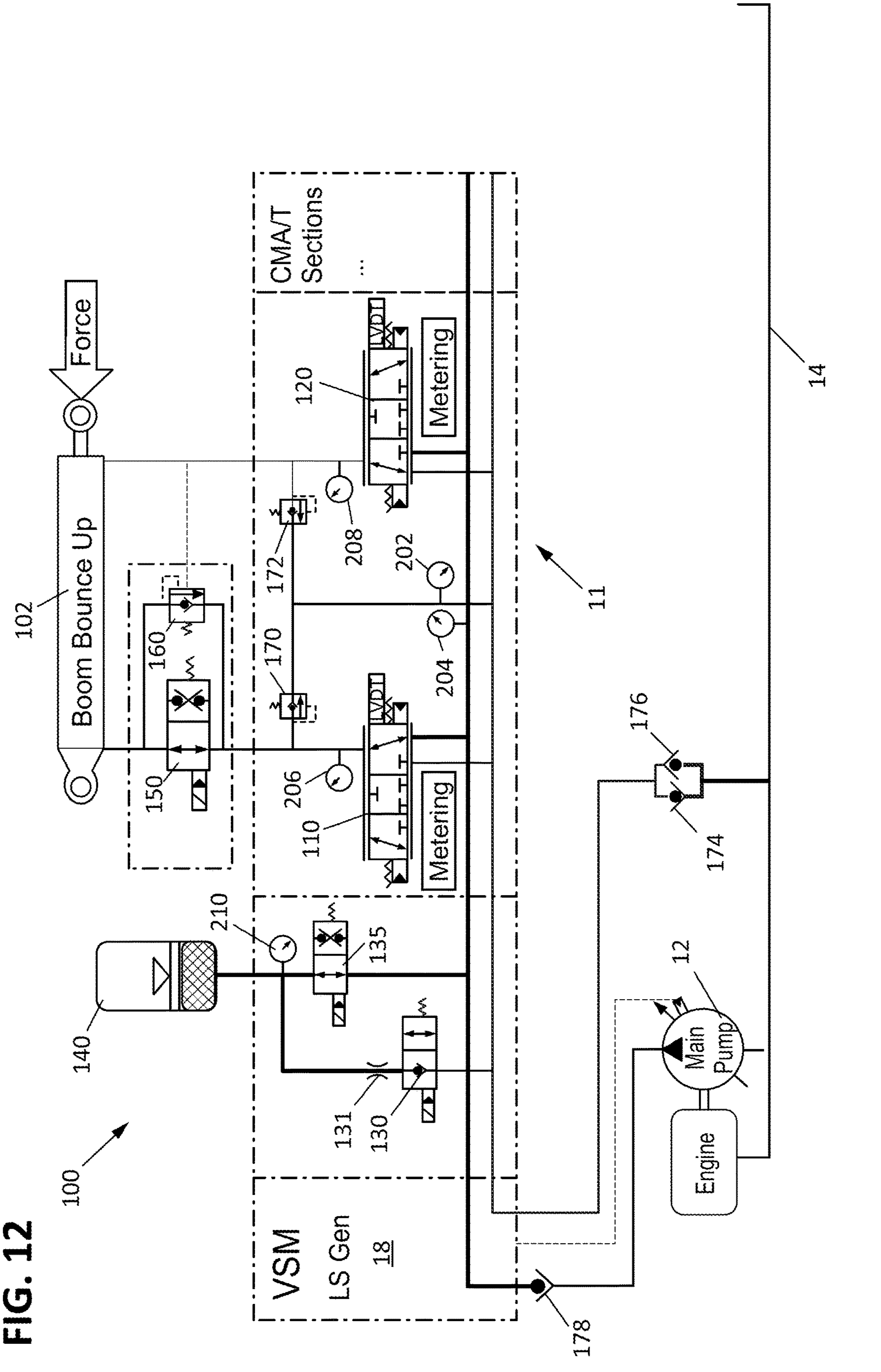
FIG. 12 is a schematic of the lift cylinder work section shown in FIG. 10, with the work section operated in a bounce up control phase.

With continued reference to FIGS. 8 and 12, the system can be placed in a ride control mode with a bounce-down control in which control valves 130 and 135 are energized to block flow from the accumulator 140 to the reservoir 14 and open flow from the accumulator to the pump-side components. Prior to engaging this mode, the control system 50 can verify via sensor 210 that the accumulator 140 is at sufficient pressure to absorb and rebound hydraulic oil coming from actuator 102. During bounce down, the oil is metered through the valve 130 into the accumulator 140 at a desired dampening rate which is accomplished by reading pressure sensors 204, 206, and 210, and by using a closed loop control of valve 110 with spool position feedback from position sensor 211. Actuator rod-side make up oil to port 104*b* may be provided from reservoir 14 through the check valve 174, which for example may be set at 0.3 bar, and fed through the fully open valve 120 and anti-cavitation function in a work port of valve 172.

Figure 9:
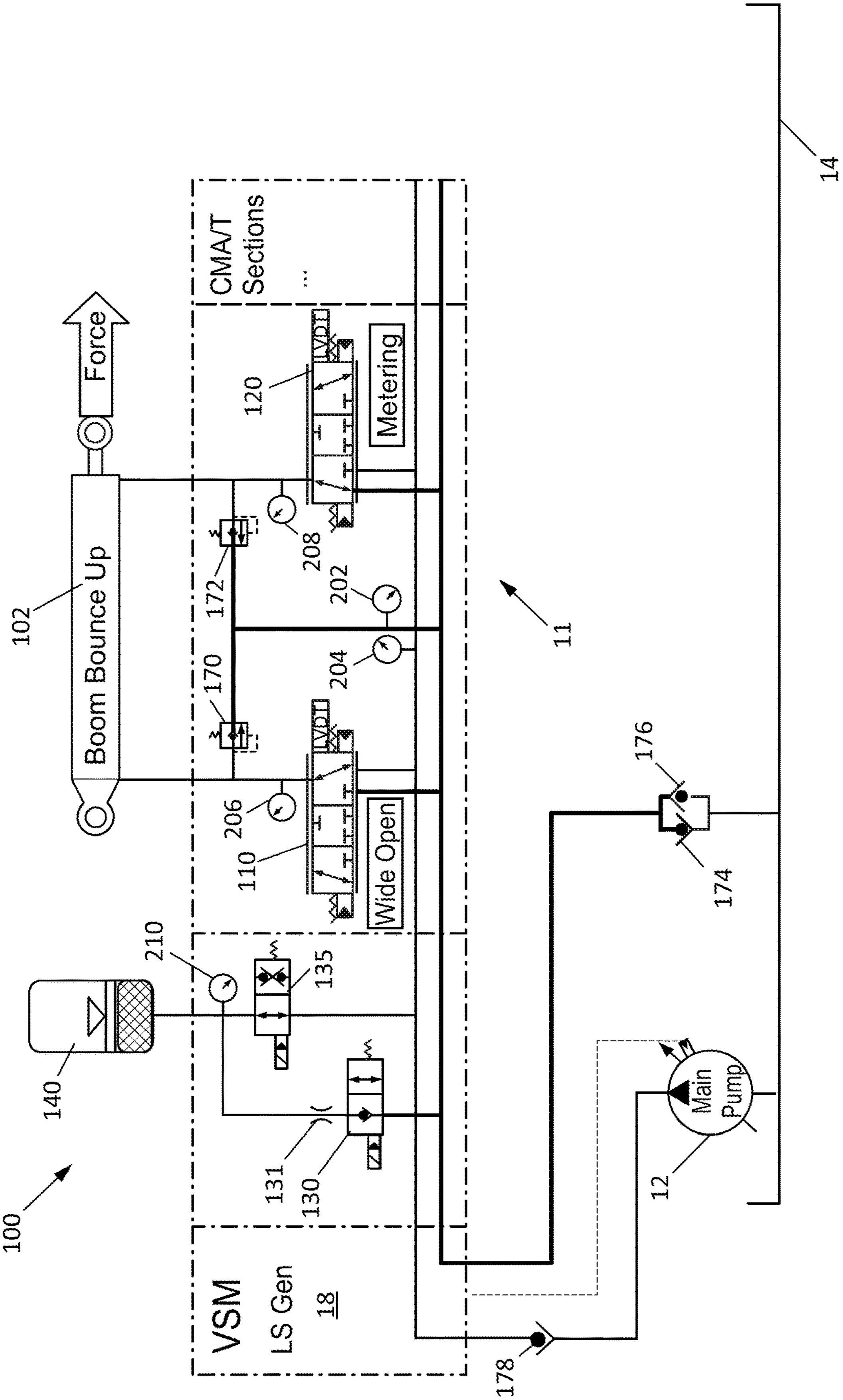
FIG. 9 is a schematic of the lift cylinder work section shown in FIG. 5, with the work section operated in a bounce up control phase.

With reference to FIGS. 9 and 12, the system 100 can be placed in a bounce-up control by activating the control valves 130, 135, by fully opening valve 110, and by metering valve 120. During bounce-up of the load, the rod-side port 104*b* oil is metered through control valve 120 and through check valve 176, which for example may be set at 5 bar. The desired dampening rate may be accomplished by reading the pressure sensors, for example pressure sensors 202 and 208, and by using a closed loop control of control valve 120 along with spool position feedback from position sensor 212. Actuator base-side make up oil at port 104*a* can be provided from the accumulator 140 through the control valve 135 and the fully open control valve 110.

Figure 10:
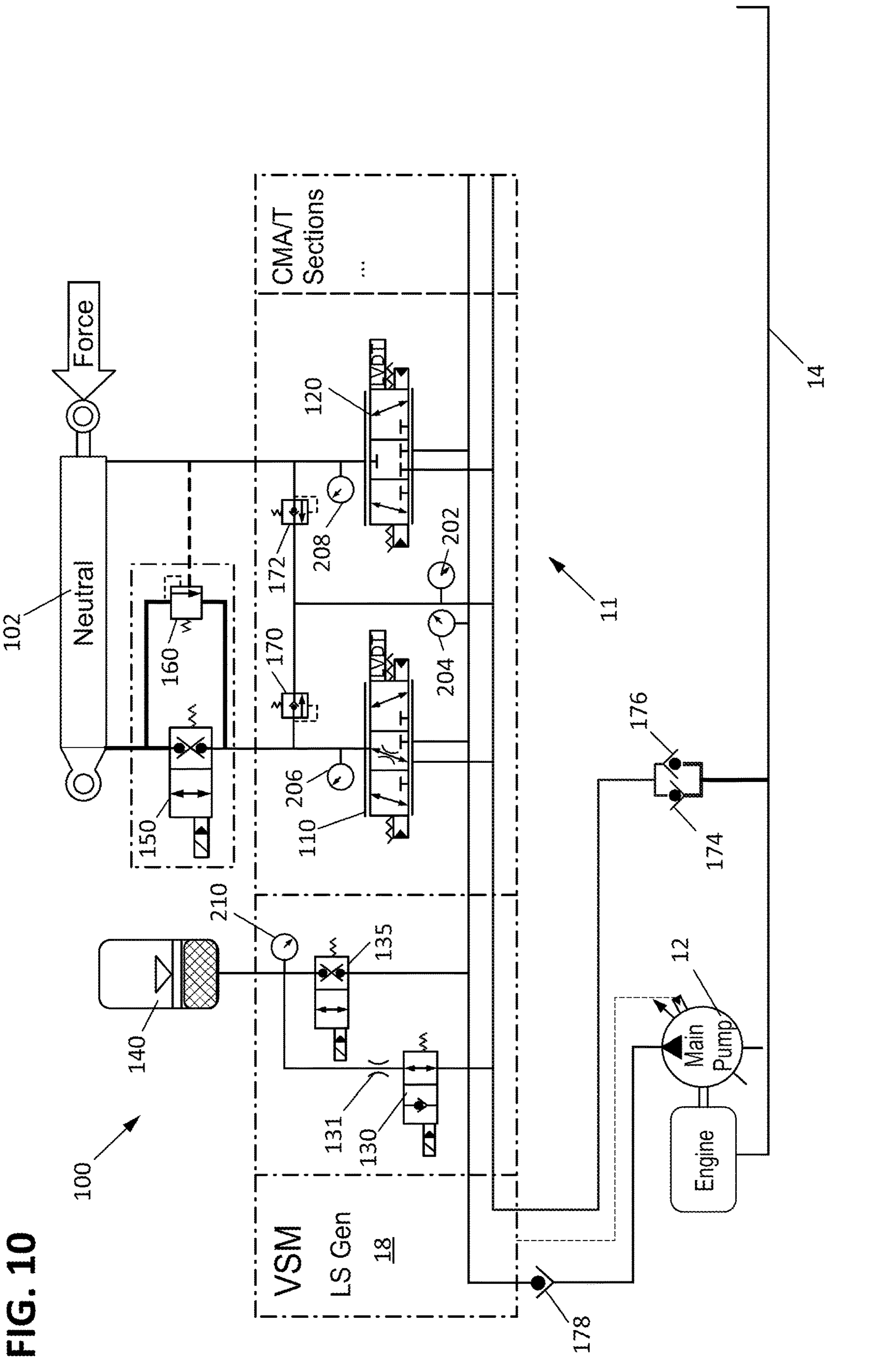
FIG. 10 is a schematic of a portion of the of the hydraulic system shown in FIG. 2 including a fifth example of a lift cylinder work section operable in a ride control mode, with the work section operated in a neutral control phase.
Figure 11:
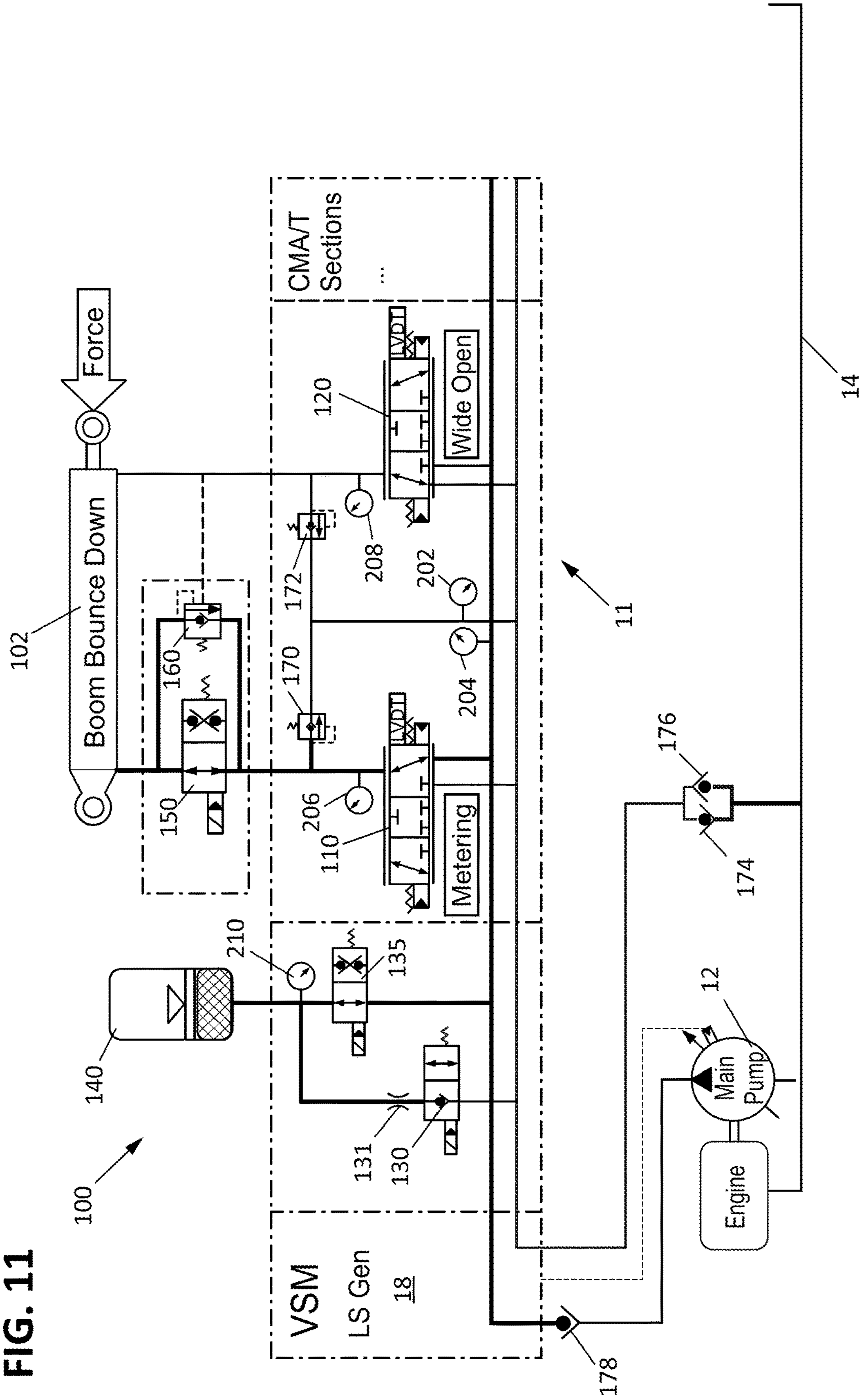
FIG. 11 is a schematic of the lift cylinder work section shown in FIG. 10, with the work section operated in a bounce down control phase.

With reference to FIG. 10, it is noted that the system is placed in a load-holding mode in which the control valve 150 is closed and the control valves 110, 120 are placed in position C such that flow to the actuator 102 is cut off from the pump 12 and reservoir. As with other examples, any flow through the relief valve 160 can pass through the internal orifice of the valve 110 and to the reservoir 14. The valve 160 allows for manual override for lowering and also provides for thermal relief. In some instances, the control system 50 can override the position of the valve 110 such that flow is not permitted through the valve 110.

Figure 13:
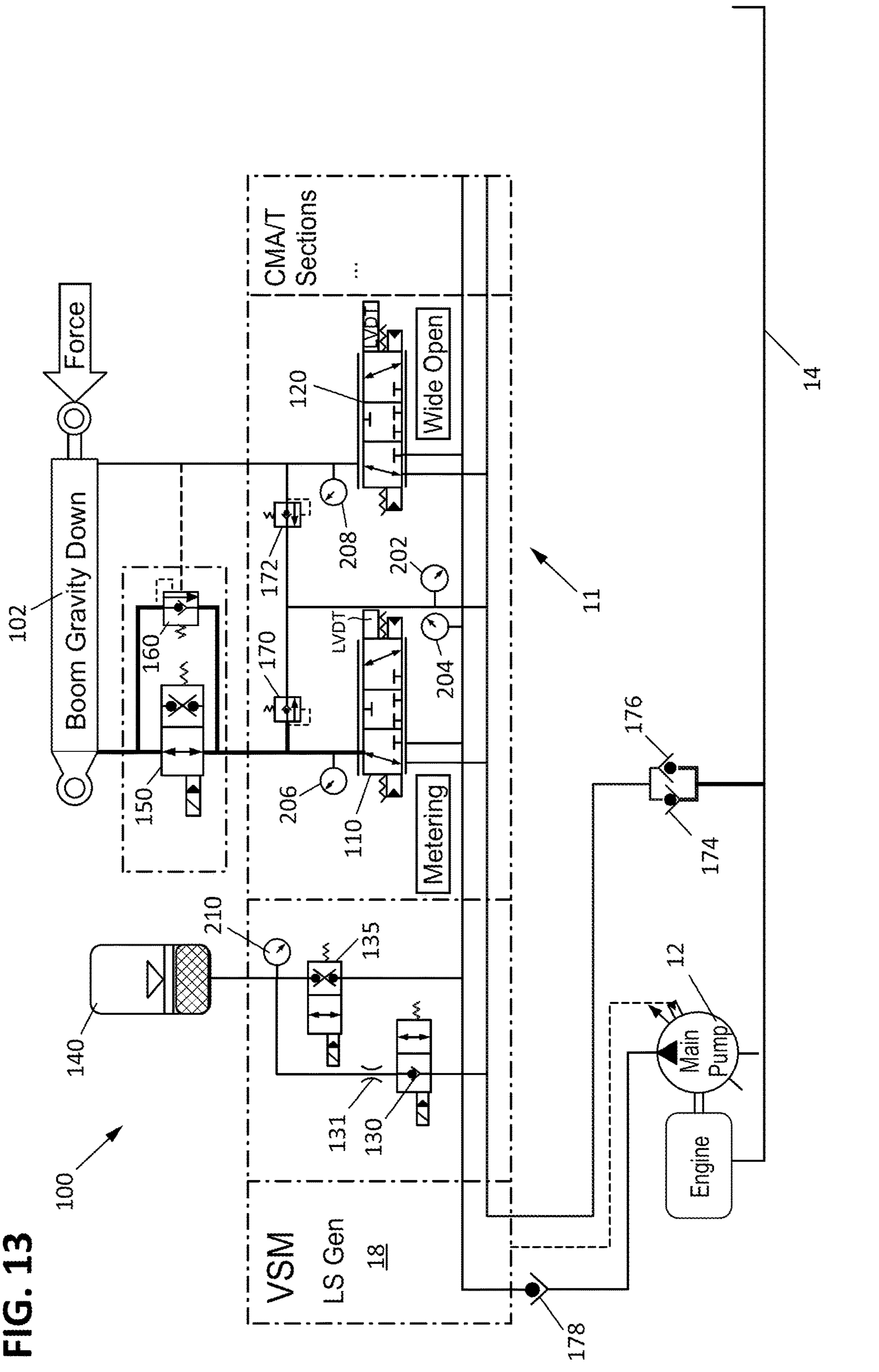
FIG. 13 is a schematic of the lift cylinder work section shown in FIG. 10, with the work section operated in a gravity down control mode.

With reference to FIG. 13, the system 100 is placed in a boom gravity-lower mode in which the control valve 120 is fully open to the reservoir 14 in position A and the valve 150 is energized to the open position. In this mode, the control valve 110 is metering in position A to allow fluid flow to pass from the base-side port 104*a* to the reservoir in a controlled manner to allow the boom 4 to lower by gravity at a desired rate. During lowering, fluid flows from the reservoir 14 to the rod-side port 104*b* via the valve 120.

Figure 14:
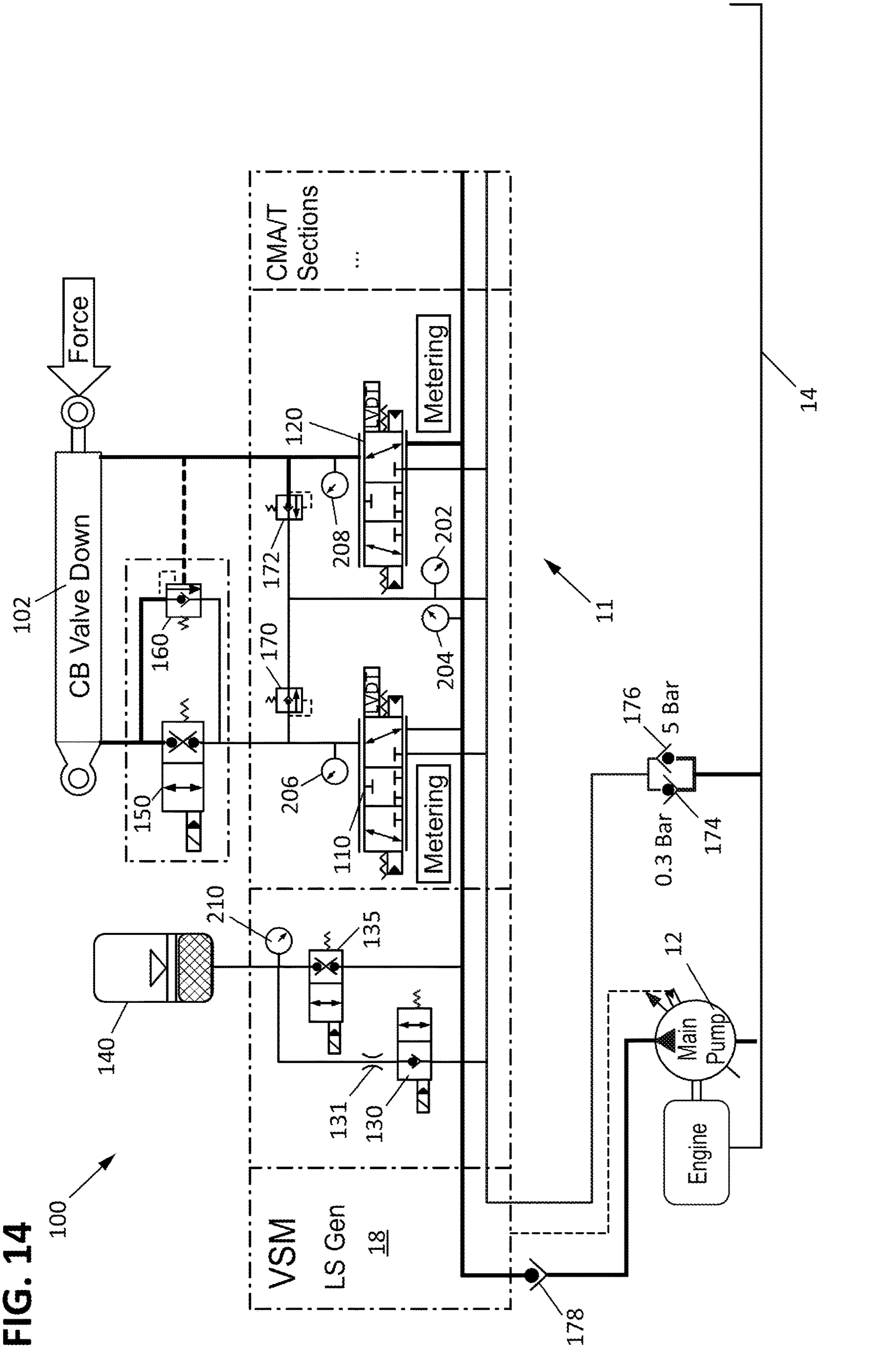
FIG. 14 is a schematic of the lift cylinder work section shown in FIG. 10, with the work section operated in a counter-balance valve down control mode.

With reference to FIG. 14, the system 100 is placed in a counterbalance valve down mode in which both of the valves 110, 120 are metering in the position B to direct flow to the reservoir 14 via the counterbalance valves 170, 172.

Figure 16:
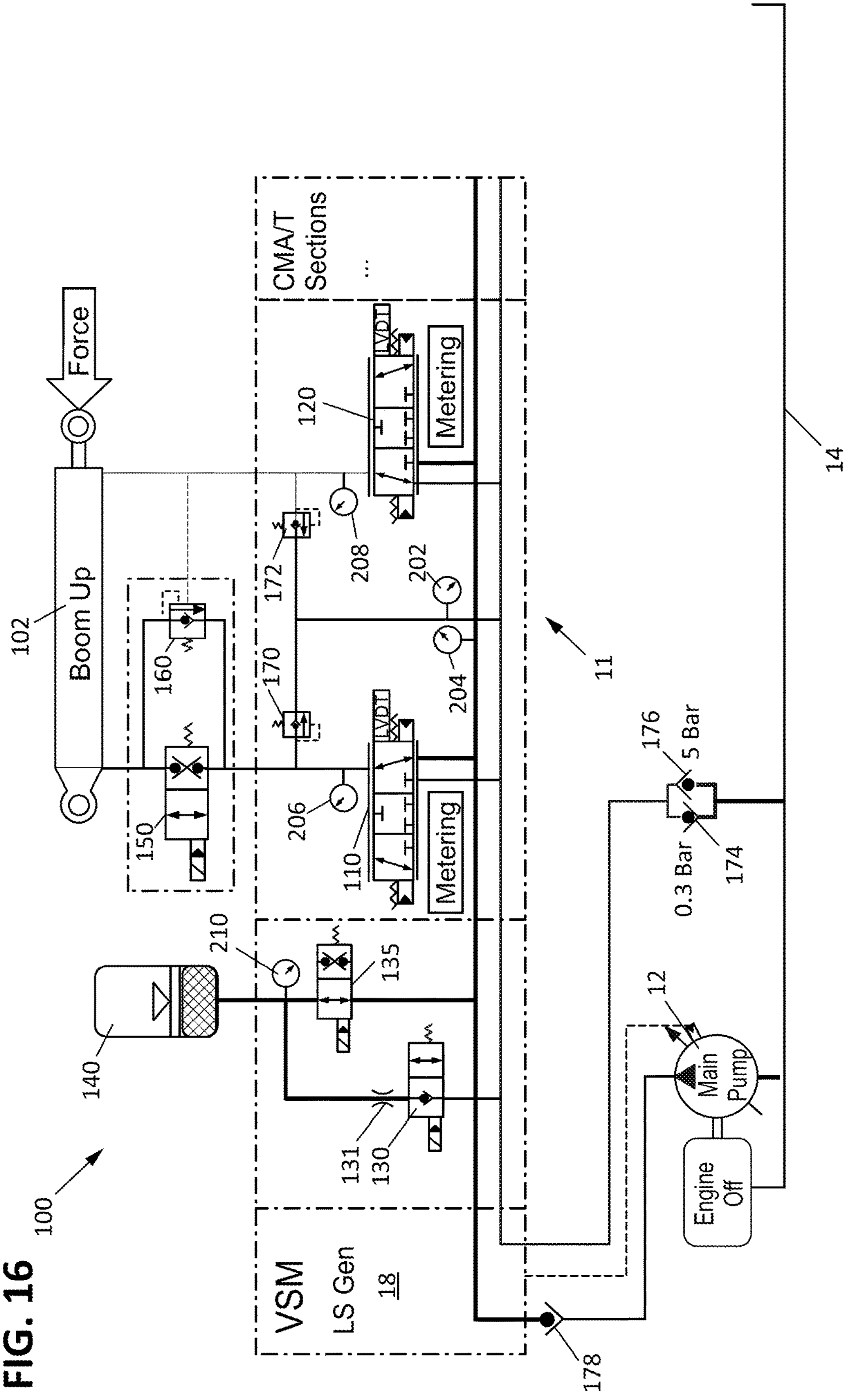
FIG. 16 is a schematic of the lift cylinder work section shown in FIG. 10, with the work section operated in a boom up control mode.

With reference to FIG. 16, it is illustrated that the actuator 102 can be actuated by the accumulator 140, for example when the engine is off and/or the pump 12 is deactivated or unavailable. In such a configuration, the valve 135 is energized into the open position, the valve 110 is metered in the position B, and the valve 120 is metered in the position A to lift the boom via actuation of the actuator 102. In one aspect, feedback from the actuator can be used to accomplish unpowered drift compensation.

Figure 17:
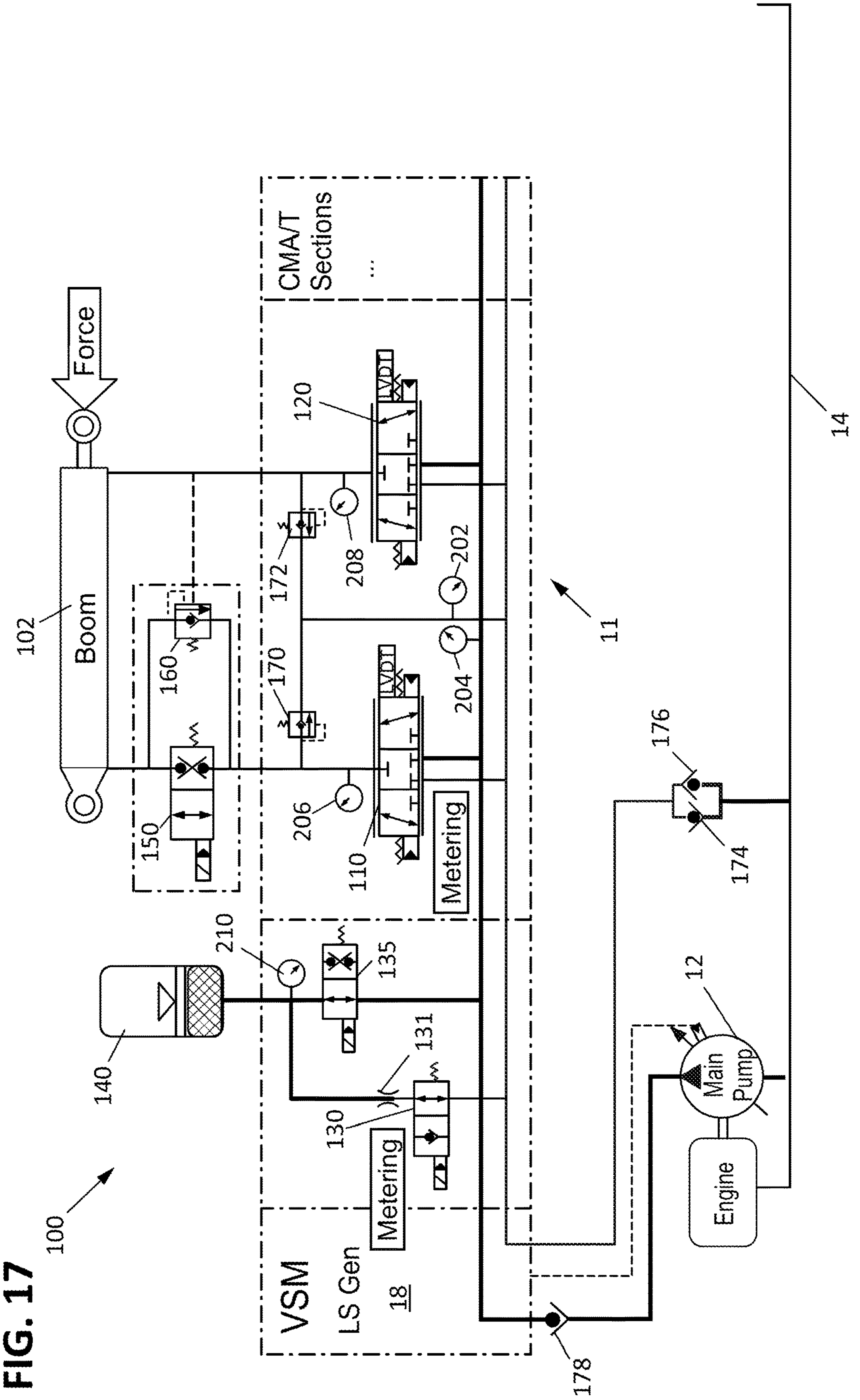
FIG. 17 is a schematic of the lift cylinder work section shown in FIG. 10, with the work section operated in a warm-up control mode.

With reference to FIG. 17, the system 100 can be operated in a warm-up cycle to raise the temperature of the hydraulic oil in the system. In such a mode, the valves 110, 120 are placed in a closed position C, the valve 135 is energized to the open position, and the valve 130 is metered in the open position such that oil flowing from the pump 12 is directed through the valves 130, 135 in a controlled manner. The pressure drop associated with the fluid flowing through these components operates to elevate the temperature of the oil. In such an operation, the pump 12 can be commanded to meet a pressure set point, for example as defined at sensor 210. The oil temperature can be monitored by a temperature sensor associated with the system 100 such that the warm-up cycle can be terminated once a desired oil temperature is achieved.

Electronic Control System 50

In one aspect, the above-described pump, control valves, pressure sensors, position sensors, and other related components can be operated by an electronic control system 50 with any desired number of inputs and outputs to achieve the above-described methods of operation. The electronic control system 50 can include multiple controllers. For example, the control system 50 can include a system-level HFX programmable controller manufactured by Eaton Corporation of Cleveland, Ohio, USA; and an Eaton VSM controller which serves as an interface module and acts as a standard vehicle CAN bus (controller area network) gateway, a DC to DC power supply, and a supervisory controller for the hydraulic valve system. In one aspect, the control system 50 can also include valve assemblies, for example valve assemblies 110, 120, that are configured within an Eaton CMA valve which includes a CAN-Enabled electrohydraulic sectional mobile valve that utilizes pressure and position sensors, on board electronics, and advanced software control algorithms.

The control system 50 can include a processor and a non-transient storage medium or memory, such as RAM, flash drive or a hard drive. Memory is for storing executable code, the operating parameters, and the input from the operator user interface while processor is for executing the code. The control system 50 can also include transmitting/receiving ports, such as a CAN bus connection or an Ethernet port for two-way communication with a WAN/LAN related to an automation system and to interrelated controllers. A user interface may be provided to activate and deactivate the system, allow a user to manipulate certain settings or inputs to the control system 50, and to view information about the system operation.

The control system 50 typically includes at least some form of memory. Examples of memory include computer readable media. Computer readable media includes any available media that can be accessed by the processor. By way of example, computer readable media include computer readable storage media and computer readable communication media. Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic system comprising:

a hydraulic actuator including a first port and a second port;

a hydraulic pump;

a hydraulic reservoir;

an accumulator;

a first control valve operable to selectively control flow from the hydraulic pump to the first port and from the first port to the hydraulic reservoir;

a second control valve operable to selectively control flow from the hydraulic pump to the second port and from the second port to the hydraulic reservoir;

a third control valve operable to selectively allow flow between the first port and the accumulator;

a controller for operating the hydraulic system and including a ride control mode in which damping is provided to the hydraulic actuator by operation of the first, second, and third control valves, wherein the ride control mode includes a passive bounce-down dampening control in which:

the first control valve is operated to isolate the first port from both the hydraulic pump and the hydraulic reservoir;

the second control valve is operated to place the second port in fluid communication with the hydraulic reservoir; and the third control valve is operated to place the accumulator in fluid communication with the first port.

2. The hydraulic system of claim 1, further comprising:

a pressure sensor in fluid communication with the second port;

wherein the ride control mode includes an active bounce-up dampening control in which:

the first control valve is operated to isolate the first port from both the hydraulic pump and the hydraulic reservoir;

the second control valve is operated to place the second port in fluid communication with the hydraulic reservoir and modulated to meet a meter-out pressure set point value at the pressure sensor; and the third control valve is operated to place the accumulator in fluid communication with the first port.

3. The hydraulic system of claim 1, wherein the third control valve is a two-position solenoid valve.

4. The hydraulic system of claim 1, further comprising:

a first pressure sensor in fluid communication with the first port;

wherein the ride control mode includes an active bounce-down dampening control in which:

the first control valve is operated to isolate the first port from both the hydraulic pump and the hydraulic reservoir;

the second control valve is operated to place the second port in fluid communication with the hydraulic reservoir; and the third control valve is operated to place the accumulator in fluid communication with the first port and modulated to meet a pressure set point value at the first pressure sensor.

5. The hydraulic system of claim 4, further comprising:

a second pressure sensor in fluid communication with the second port;

wherein the ride control mode includes an active bounce-up dampening control wherein:

the first control valve is operated to isolate the first port from both the hydraulic pump and the hydraulic reservoir;

the second control valve is operated to place the second port in fluid communication with the hydraulic reservoir and modulated to meet a meter-out pressure set point value at the second pressure sensor; and the third control valve is operated to place the accumulator in fluid communication with the first port and modulated to meet a pressure set point value at the first pressure sensor.

6. The hydraulic system of claim 1, further comprising:

a fourth control valve disposed between the first port and the first control valve, and wherein the fourth control valve is operable between open and closed positions and is placed in the closed position when the ride control mode is active.

7. The hydraulic system of claim 6, further comprising:

a relief valve in fluid communication with the first port and the first control valve;

wherein the first control valve has a neutral position including an orifice placing the hydraulic reservoir in fluid communication with the first port via an orifice within the first control valve; and wherein, when the ride control mode is active, the first control valve is in the neutral position such that when hydraulic fluid flows through the relief valve, the hydraulic fluid flows through the orifice to the hydraulic reservoir.

8. The hydraulic system of claim 7, wherein the relief valve is piloted by fluid from the second port.

9. The hydraulic system of claim 1, wherein the hydraulic actuator is a linear type actuator having a piston rod slidably disposed within a housing and wherein the first port is a base-side port and the second port is a rod-side port.

10. A hydraulic system comprising:

a hydraulic actuator including a piston rod slidably disposed within a housing having a base-side port and a rod-side port;

a hydraulic pump;

a hydraulic reservoir;

an accumulator;

a first control valve operable to selectively control flow from the hydraulic pump to the base-side port and from the base-side port to the hydraulic reservoir;

a second control valve operable to selectively control flow from the hydraulic pump to the rod-side port and from the rod-side port to the hydraulic reservoir;

a third control valve operable to selectively allow flow between the base-side port and the accumulator;

a controller for operating the hydraulic system and including a ride control mode in which damping is provided to the hydraulic actuator by operation of the first, second, and third control valves, wherein the ride control mode includes a passive bounce-down dampening control in which:

the first control valve is operated to isolate the base-side port from both the hydraulic pump and the hydraulic reservoir;

the second control valve is operated to place the rod-side port in fluid communication with the hydraulic reservoir; and the third control valve is operated to place the accumulator in fluid communication with the base-side port.

11. The hydraulic system of claim 10, further comprising:

a pressure sensor in fluid communication with the rod-side port;

wherein the ride control mode includes an active bounce-up dampening control in which:

the first control valve is operated to isolate the base-side port from both the hydraulic pump and the hydraulic reservoir;

the second control valve is operated to place the rod-side port in fluid communication with the hydraulic reservoir and modulated to meet a meter-out pressure set point value at the pressure sensor; and the third control valve is operated to place the accumulator in fluid communication with the base-side port.

12. The hydraulic system of claim 10, wherein the third control valve is a two-position solenoid valve.

13. The hydraulic system of claim 10, further comprising:

a first pressure sensor in fluid communication with the base-side port;

wherein the ride control mode includes an active bounce-down dampening control in which:

the first control valve is operated to isolate the base-side port from both the hydraulic pump and the hydraulic reservoir;

the second control valve is operated to place the rod-side port in fluid communication with the hydraulic reservoir; and the third control valve is operated to place the accumulator in fluid communication with the base-side port and modulated to meet a pressure set point value at the first pressure sensor.

14. The hydraulic system of claim 13, further comprising:

a second pressure sensor in fluid communication with the rod-side port;

wherein the ride control mode includes an active bounce-up dampening control wherein:

the first control valve is operated to isolate the base-side port from both the hydraulic pump and the hydraulic reservoir;

the second control valve is operated to place the rod-side port in fluid communication with the hydraulic reservoir and modulated to meet a meter-out pressure set point value at the second pressure sensor; and the third control valve is operated to place the accumulator in fluid communication with the base-side port and modulated to meet a pressure set point value at the first pressure sensor.

15. The hydraulic system of claim 10, further comprising:

a fourth control valve disposed between the base-side port and the first control valve, and wherein the fourth control valve is operable between open and closed positions and is placed in the closed position when the ride control mode is active.

16. The hydraulic system of claim 15, further comprising:

a relief valve in fluid communication with the base-side port and the first control valve;

wherein the first control valve has a neutral position including an orifice placing the hydraulic reservoir in fluid communication with the base-side port via an orifice within the first control valve; and wherein, when the ride control mode is active, the first control valve is in the neutral position such that when hydraulic fluid flows through the relief valve, the hydraulic fluid flows through the orifice to the hydraulic reservoir.

17. The hydraulic system of claim 16, wherein the relief valve is piloted by fluid from the rod-side port.

18. A hydraulic system comprising:

a hydraulic actuator including a first port and a second port;

a hydraulic pump;

a hydraulic reservoir;

an accumulator;

a first control valve operable to selectively control flow from the hydraulic pump to the first port and from the first port to the hydraulic reservoir;

a second control valve operable to selectively control flow from the hydraulic pump to the second port and from the second port to the hydraulic reservoir;

a third control valve operable to selectively allow flow between the first port and the accumulator;

a controller for operating the hydraulic system and including a ride control mode in which damping is provided to the hydraulic actuator by operation of the first, second, and third control valves, a pressure sensor in fluid communication with the second port;

wherein the ride control mode includes an active bounce-up dampening control in which:

the first control valve is operated to isolate the first port from both the hydraulic pump and the hydraulic reservoir;

the second control valve is operated to place the second port in fluid communication with the hydraulic reservoir and modulated to meet a meter-out pressure set point value at the pressure sensor; and the third control valve is operated to place the accumulator in fluid communication with the first port.

19. A hydraulic system comprising:

a hydraulic actuator including a piston rod slidably disposed within a housing having a base-side port and a rod-side port;

a hydraulic pump;

a hydraulic reservoir;

an accumulator;

a first control valve operable to selectively control flow from the hydraulic pump to the base-side port and from the base-side port to the hydraulic reservoir;

a second control valve operable to selectively control flow from the hydraulic pump to the rod-side port and from the rod-side port to the hydraulic reservoir;

a third control valve operable to selectively allow flow between the base-side port and the accumulator;

a controller for operating the hydraulic system and including a ride control mode in which damping is provided to the hydraulic actuator by operation of the first, second, and third control valves, a pressure sensor in fluid communication with the rod-side port;

wherein the ride control mode includes an active bounce-up dampening control in which:

the first control valve is operated to isolate the base-side port from both the hydraulic pump and the hydraulic reservoir;

the second control valve is operated to place the rod-side port in fluid communication with the hydraulic reservoir and modulated to meet a meter-out pressure set point value at the pressure sensor; and the third control valve is operated to place the accumulator in fluid communication with the base-side port.

20. A hydraulic system comprising:

a hydraulic actuator including a first port and a second port;

a hydraulic pump;

a hydraulic reservoir;

an accumulator;

a first control valve operable to selectively control flow from the hydraulic pump to the first port and from the first port to the hydraulic reservoir;

a second control valve operable to selectively control flow from the hydraulic pump to the second port and from the second port to the hydraulic reservoir;

a third control valve operable to selectively allow flow between the first port and the accumulator;

a controller for operating the hydraulic system and including a ride control mode in which damping is provided to the hydraulic actuator by operation of the first, second, and third control valves; and a pressure sensor in fluid communication with the second port, wherein the ride control mode includes an active bounce-up dampening control in which:

the first control valve is operated to isolate the first port from both the hydraulic pump and the hydraulic reservoir;

the second control valve is operated to place the second port in fluid communication with the hydraulic reservoir and modulated to meet a meter-out pressure set point value at the pressure sensor; and the third control valve is operated to place the accumulator in fluid communication with the first port.

21. A hydraulic system comprising:

a hydraulic actuator including a first port and a second port;

a hydraulic pump;

a hydraulic reservoir;

an accumulator;

a first control valve operable to selectively control flow from the hydraulic pump to the first port and from the first port to the hydraulic reservoir;

a second control valve operable to selectively control flow from the hydraulic pump to the second port and from the second port to the hydraulic reservoir;

a third control valve operable to selectively allow flow between the first port and the accumulator;

a controller for operating the hydraulic system and including a ride control mode in which damping is provided to the hydraulic actuator by operation of the first, second, and third control valves; and a first pressure sensor in fluid communication with the first port, wherein the ride control mode includes an active bounce-down dampening control in which:

the first control valve is operated to isolate the first port from both the hydraulic pump and the hydraulic reservoir;

the second control valve is operated to place the second port in fluid communication with the hydraulic reservoir; and the third control valve is operated to place the accumulator in fluid communication with the first port and modulated to meet a pressure set point value at the first pressure sensor.

22. The hydraulic system of claim 21, further comprising:

a second pressure sensor in fluid communication with the second port, wherein the ride control mode includes an active bounce-up dampening control wherein:

the first control valve is operated to isolate the first port from both the hydraulic pump and the hydraulic reservoir;

the second control valve is operated to place the second port in fluid communication with the hydraulic reservoir and modulated to meet a meter-out pressure set point value at the second pressure sensor; and the third control valve is operated to place the accumulator in fluid communication with the first port and modulated to meet a pressure set point value at the first pressure sensor.

23. A hydraulic system comprising:

a hydraulic actuator including a first port and a second port;

a hydraulic pump;

a hydraulic reservoir;

an accumulator;

a first control valve operable to selectively control flow from the hydraulic pump to the first port and from the first port to the hydraulic reservoir;

a second control valve operable to selectively control flow from the hydraulic pump to the second port and from the second port to the hydraulic reservoir;

a third control valve operable to selectively allow flow between the first port and the accumulator;

a controller for operating the hydraulic system and including a ride control mode in which damping is provided to the hydraulic actuator by operation of the first, second, and third control valves; and a fourth control valve disposed between the first port and the first control valve, wherein the fourth control valve is operable between open and closed positions, and is placed in the closed position when the ride control mode is active.

* * * * *